United States Patent [19]

Cheng

[11] Patent Number: 5,791,804
[45] Date of Patent: Aug. 11, 1998

[54] BENDABLE JOINT FOR A COLLAPSIBLE PLAYPEN

[75] Inventor: Ying-Hsiung Cheng, Tainan Hsien, Taiwan

[73] Assignee: Top Fortune Ltd., San Diego, Calif.

[21] Appl. No.: 757,326

[22] Filed: Nov. 27, 1996

[51] Int. Cl.$^6$ .............................. B62B 7/08; A14D 7/00
[52] U.S. Cl. ........................ 403/97; 5/99.1; 16/326
[58] Field of Search ............................ 403/93, 94, 96, 403/97, 100–102, 83, 84; 5/99.1, 98.1, 93.1, 98.3; 16/325–329, 332, 335; 256/25, 26

[56] References Cited

U.S. PATENT DOCUMENTS

| | | |
|---|---|---|
| 5,039,118 | 8/1991 | Huang ........................ 403/96 X |
| 5,377,368 | 1/1995 | Cheng ........................ 5/99.1 |
| 5,381,570 | 1/1995 | Cheng ........................ 5/99.1 |
| 5,530,977 | 7/1996 | Wang ........................ 16/326 X |
| 5,542,151 | 8/1996 | Stranski et al. ........................ 5/99.1 X |
| 5,617,592 | 4/1997 | Cheng ........................ 5/99.1 |

*Primary Examiner*—Thomas R. Hannon
*Attorney, Agent, or Firm*—Morton J. Rosenberg; David I. Klein; Jun Y. Lee

[57] ABSTRACT

A bendable joint for a collapsible playpen includes two disc housings, two discs, a main body and a push cap and two screws. The discs has two sector-shaped projections, and a projeting pin provided on a side wall of one of the sector-shaped projections to engage a pin hole provided in a side wall of one of two opposite projections of the main body to keep the disc housings, the discs and the main body and the push cap in a spread position securely, without potential dangers of the playpen suddenly collapsed by the joint bent by careless press of the push cap.

1 Claim, 6 Drawing Sheets

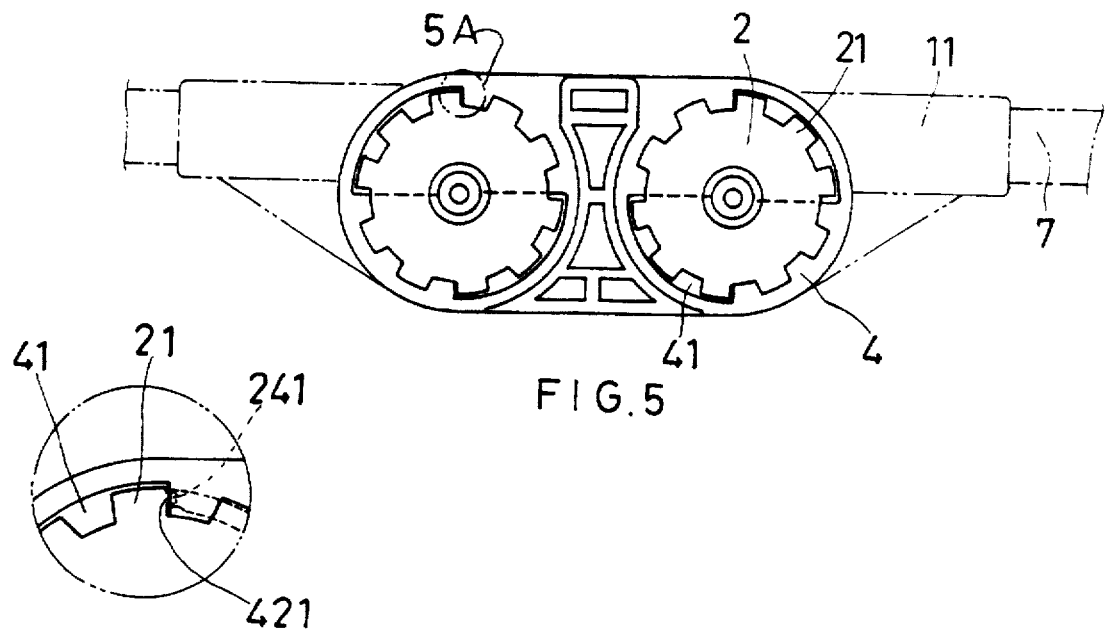
FIG. 5
FIG. 5A
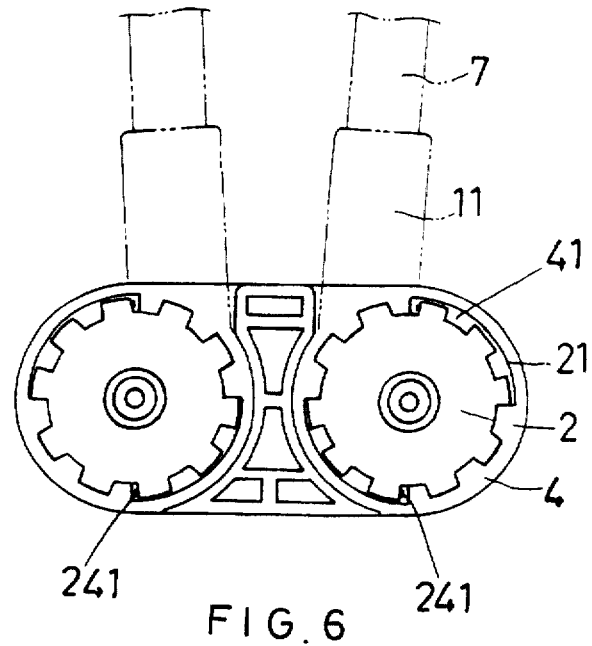
FIG. 6

BENDABLE JOINT FOR A COLLAPSIBLE PLAYPEN

BACKGROUND OF THE INVENTION

This invention concerns a bendable joint for a collapsible playpen, particularly having a substantial safety in a spread position by means of a projecting pin of two disc engaging pin holes of a main body.

There is a known conventional collapsible playpen of U.S. patent application Ser. No. 08/616,093 filed on Mar. 15, 1996 and which issued 8 Apr. 1997 as U.S. Pat. No. 5,617,592. It is invented by the same applicant of this new case.

The conventional collapsible playpen referred above is shown in FIG. 8, mainly having two disc housings 10, two discs 20, two springs 30, a main body 40, two screws 50 and a push cap 60 assembled together.

The two disc housings 10 respectively have a tubular portion 101 extending out from a circular portion, an inner cavity 12 formed in an inner side of the circular portion, a plurality of teeth not shown around a wall of the inner cavity, and a center hole in the inner cavity. The teeth of the inner cavity engage with teeth 201 of the discs 20 with an aperture for a little movement for one another.

The discs 20 respectively have a plurality of teeth 201 of different thickness around the periphery, a hole in a proper location, and two opposite sector-shaped cavity (not shown) in one side.

The main body 40 has two opposite sector-shaped projections 401 on one side to fit in the sector-shaped cavities of the discs 2 with a proper tightness, and two center holes 402 spaced apart, and a hook hole 403 in a proper location.

The push cap 60 has two sidewise hooks 601 respectively in two opposite sides.

In assembling, the discs 20 are placed in the disc housings 10, and the springs 30 are placed between the main body 40 and the two disc housings 10, with screws 50 inserted through the two center holes 402, th e springs 30, the center holes 202 of the discs 20 and the holes of the disc housings 104 and screwed with nuts 501. Then the disc housing s 10, the discs 20, and the main body 40 are combined with one another in place. Finally th e push cap 60 is closed on the outer side of the main body 40, with the hooks 601 engaging the hook holes 403 of the main body 40, finishing assemblage of the conventional joint for a collapsible playpen.

In a spread position, the teeth 201 of the discs 20 have one side wall normally engaging tightly with one side wall of the teeth of the disc housings, with the discs 20 tightly located in the main body 40. Then the push cap 60 is impossible to be pressed. But if the joint is raised up a little, the teeth 201 of the discs 20 and the teeth of the disc housings 10 no longer engage with one another tightly, and then the push cap 60 can be pressed to push the discs 20 completely to move into the disc housings 10 so that the joint may be prevented from the potential danger of collapsing the playpen, caused by careless press of the push cap 60.

SUMMARY OF THE INVENTION

This invention has been devised to offer a different kind of a bendable joint for a collapsible playpen.

A main feature of the present invention is a pin provided to extend out from a side wall of the sector-shaped projections of the discs and a pin hole provided in a side wall of the sector-shaped projections of the main body, and the pin can engage with the pin hole so that the disc housings, the discs, the main body and the push cap are kept securely in place in a spread position, without any potential dangers of the playpen being collapsed by bending of the joint caused by careless press of the push cap. And the rest of the structure of the present invention is almost the same as the conventional one referred above.

BRIEF DESCRIPTION OF DRAWINGS

This invention will be better understood by referring to the accompanying drawings, wherein:

FIG. 5 is a side view of the bendable joint for a collapsible playpen in the present invention, showing it viewed from the opposite side of FIG. 3;

FIG. 6 is a side view of the bendable joint for a collapsible playpen in the present invention, showing it in a bent position and viewed from the opposite side of FIG. 4;

DESCRIPTION OF THE PREFERRED EMBODIMENT

Figure 1:
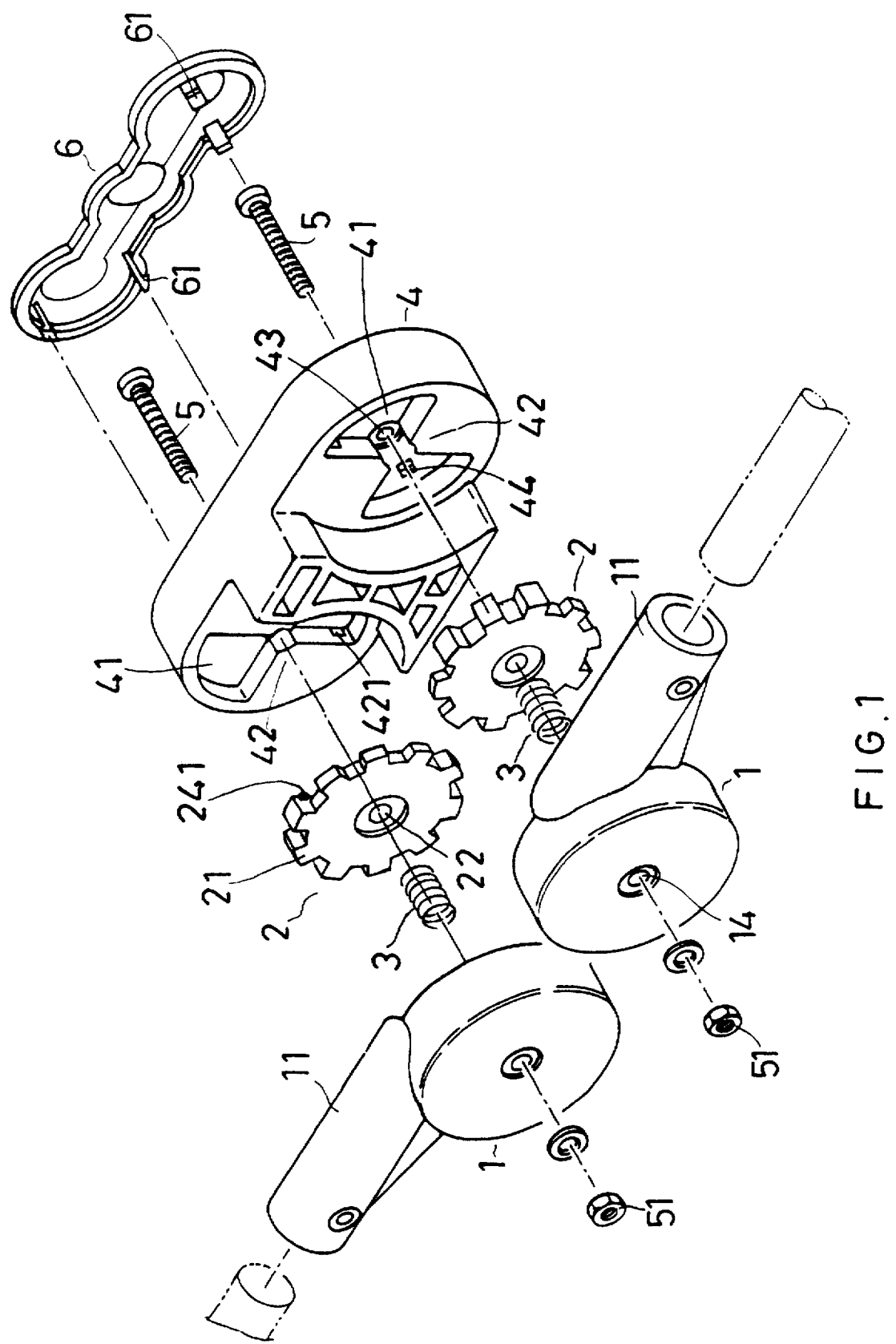
FIG. 1 is an exploded perspective view of a bendable joint for a collapsible playpen in the present invention.
Figure 2:
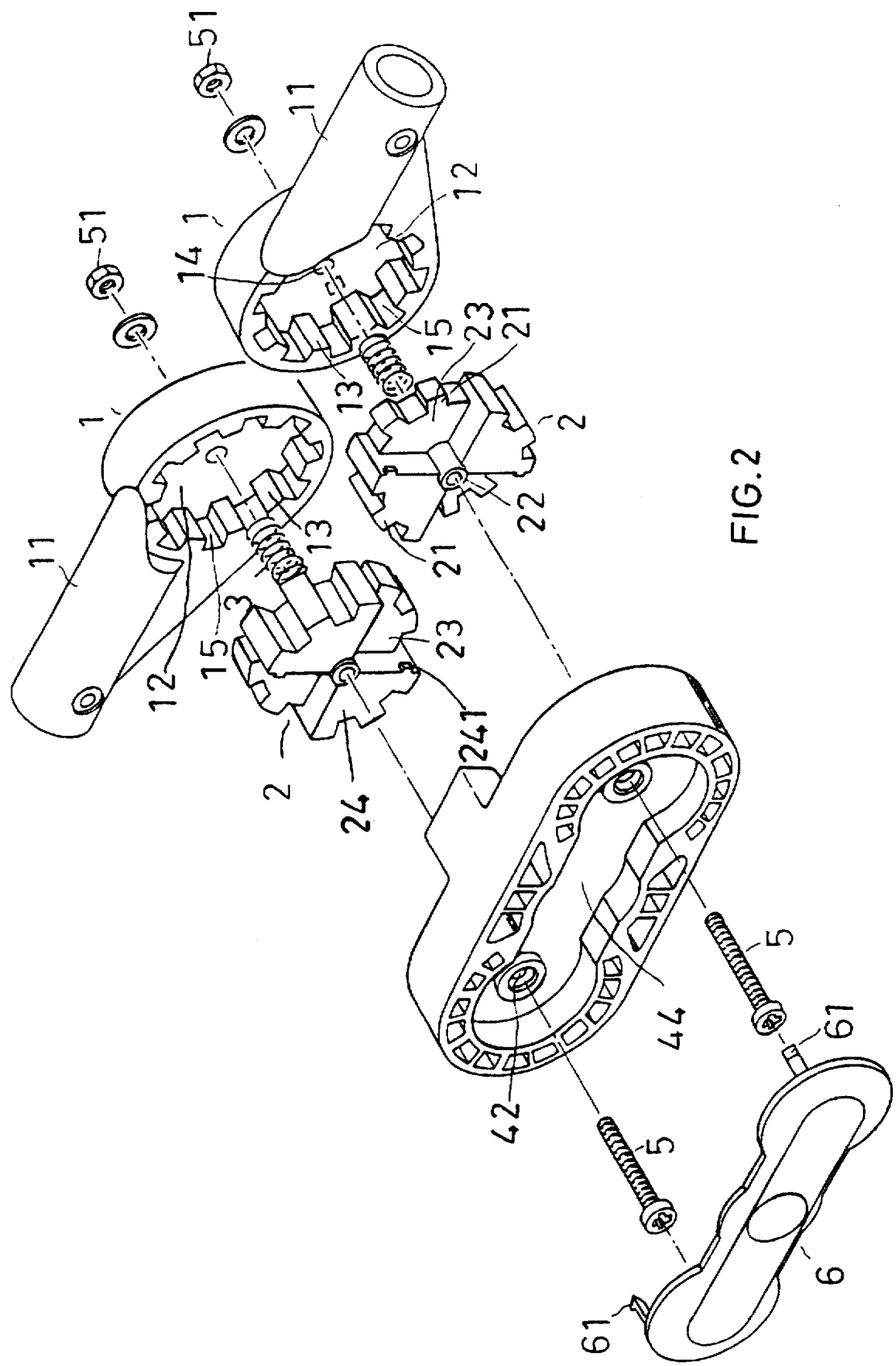
FIG. 2 is an exploded perspective view of a bendable joint for a collapsible playpen in the present invention, viewed from the opposite side of FIG. 1.

A preferred embodiment of a bendable joint for a collapsible playpen in the present invention, as shown in FIGS. 1 and 2, includes two disc housings 1, two discs 2, two springs 3, a main body 4, two screws 5, and a push cap 6 combined together.

The two disc housings 1 respectively have a circular portion, and a tubular portion 11 extending out from the circular portion for a frame bar 7 to insert therein, an inner cavity 12 formed in an inner side of the circular portion, a plurality of teeth 13 formed around the wall defining the inner cavity 12, and a center hole 14 in the inner cavity 12. The inner cavity is for each disc 2 to fit therein, and the teeth 13 engage with the teeth 21 of the disc 2 in a little loose condition.

The discs 2 respectively have a plurality of teeth 21 of different thickness engaging with the teeth 13 of the disc housing 1, and a center hole 22, two opposite sector recesses 23 in an inner side, two opposite sector-projections 24 abutting with the two sector-shaped recesses 23 in the inner side, and a pin 241 respectively projecting on a side wall of each projection 24.

The main body 4 has two opposite sector-shaped cavities 41 in one side for the sector-shaped projections 24 of the the discs 2 to fit therein with a little aperture between them, and two sector-shaped projections 42 abutting the two cavities 41, and a pin hole 421 bored in a side wall of one of the projection 42. The main body 4 further has a center hole 43 respectively in each cavity 41, a hook hole 44 beside the center hole 43, and an inner cavity 45 in the other side for receiving the push cap 6.

The push cap 6 has two hooks 61 at two opposite sides to hook in the hook holes 44 of the main body 4 so as not to fall off the main body after closed on the outer side of the main body 4.

Figure 3:
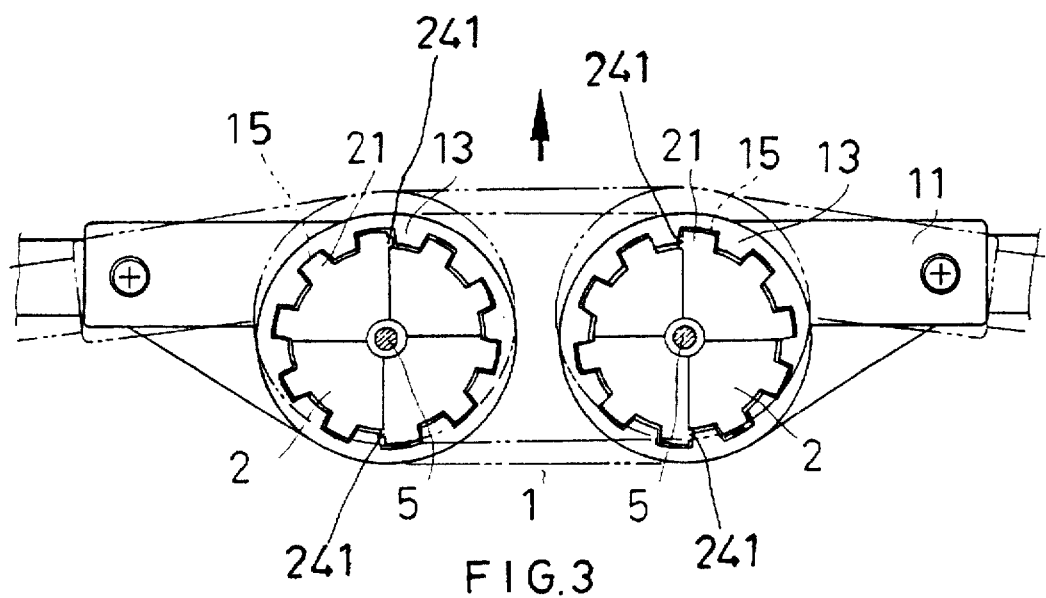
FIG. 3 is a side view of the bendable joint for a collapsible playpen in the present invention, showing it in movement.
Figure 4:
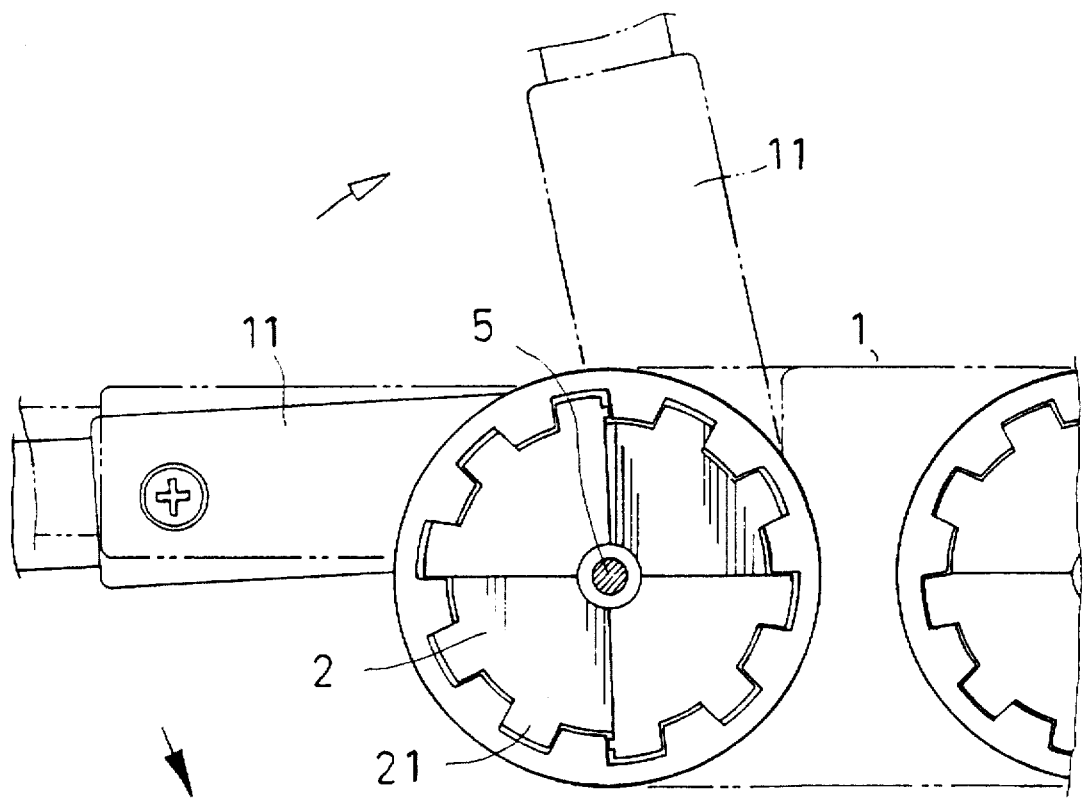
FIG. 4 is a part magnified view of the bendable joint for a collapsible playpen in the present invention, showing it in movement.
Figure 7:
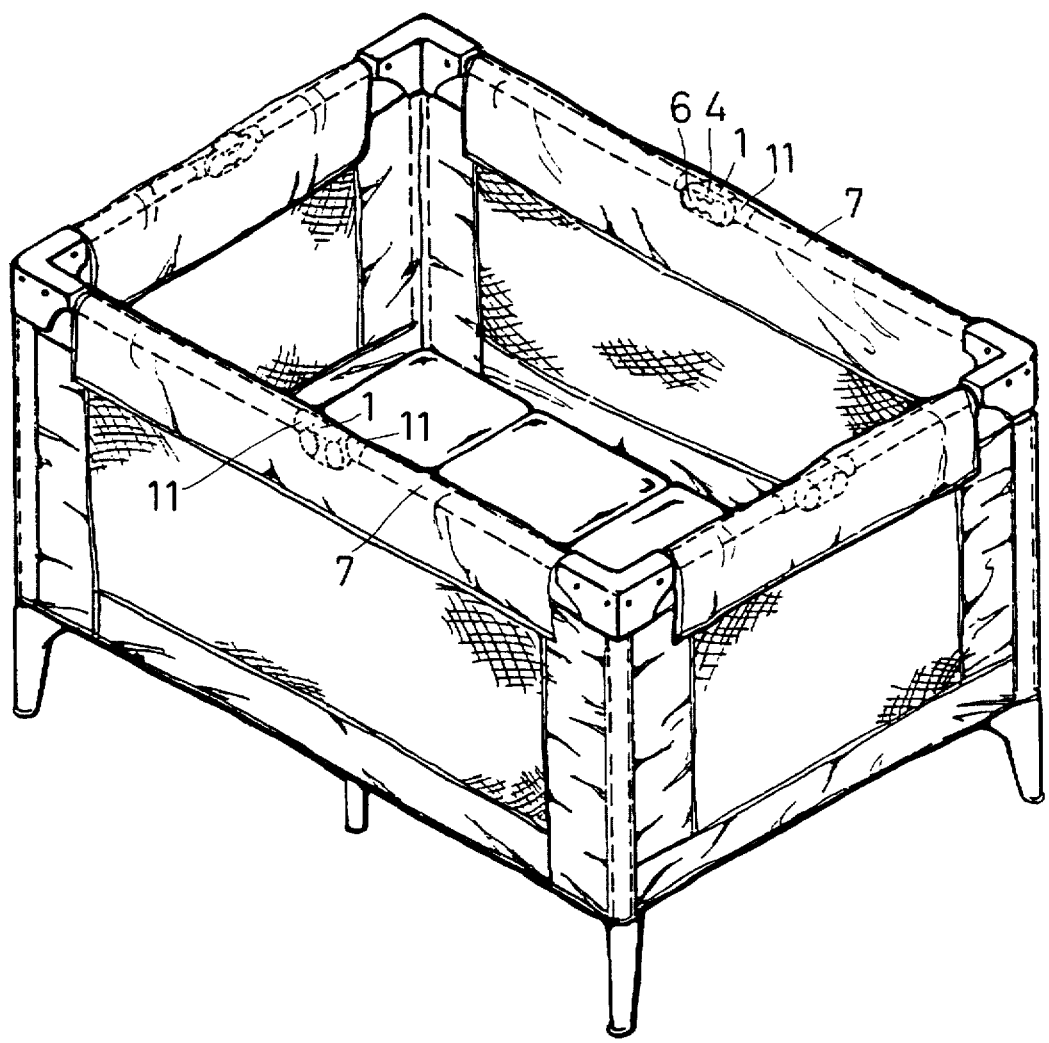
FIG. 7 is a perspective view of the bendable joint assembled in a collapsible playpen in the present invention; and, FIG. 8 is an exploded perspective view of a known conventional bendable joint for a collapsible playpen.
Figure 8:
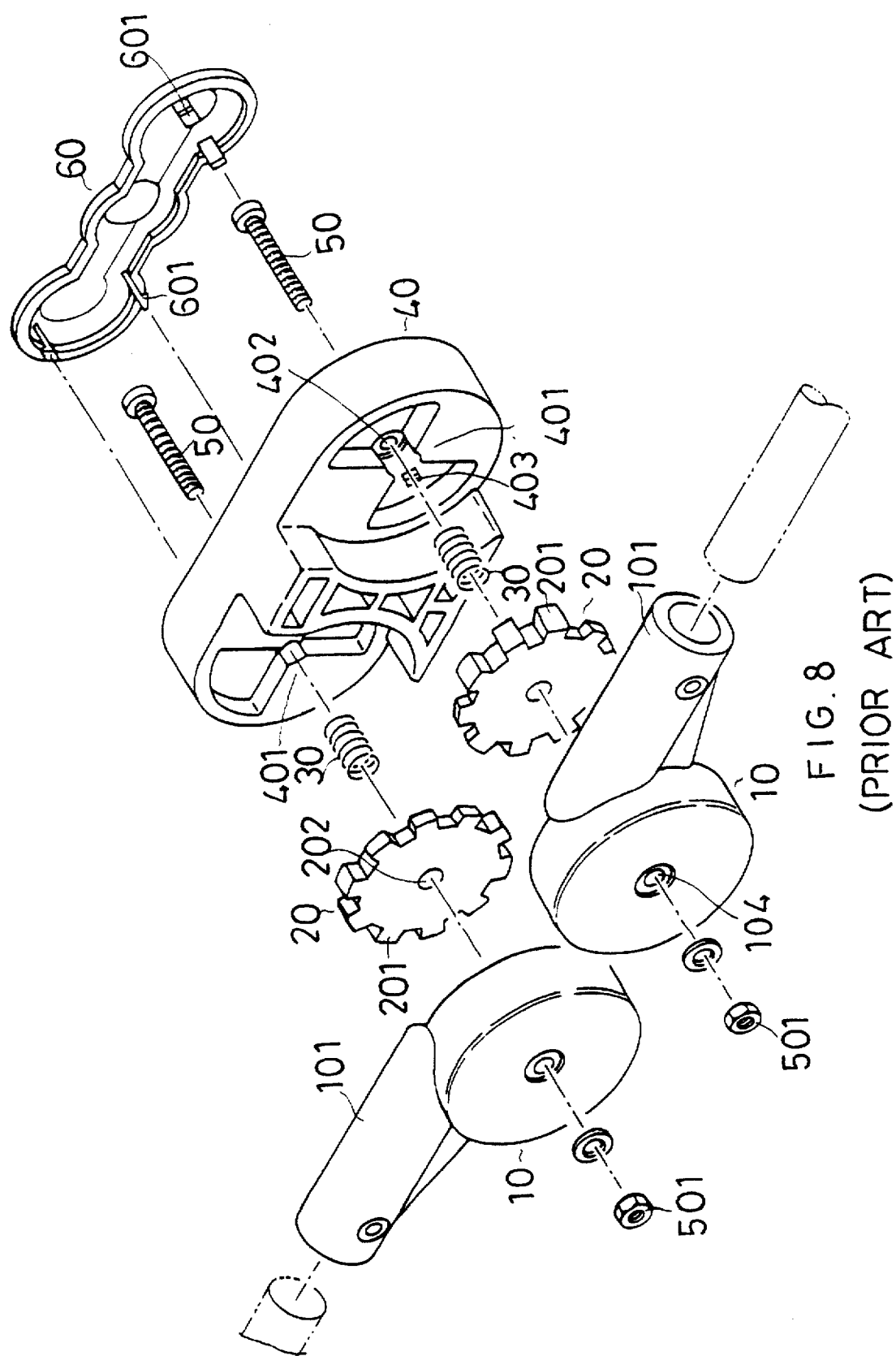

In assembling, referring to FIGS. 3 and 5, firstly, the springs 3 and the discs 2 are placed in the disc housings 1, and then the main body 4 is assembled with the two disc housings 1, with the screws 5 inserted through the center holes 43 of the main body 4, the center holes 22 of the discs 2, the springs 3 and the disc housings 1 and then screwing with the nuts 51. In results, the disc housings 1, the discs 2 and the main body 4 are assembled together in place. After that, the push cap 6 is on the outer side of the main body 4, with the hooks 61 hooking in the hook holes 44, finishing assemblage of this bendable joint. Now this bendable joint is ready for the frame bar 7 to assemble in forming a playpen.

When the bendable joint is in a spread position, referring to FIGS. 4, 5, 6 and 7, the frame bar 7 and the tubular portion 11 of the disc housing 1 is a little sloping down and the inner end of the tubular portion 11 is a little upward so that the pin 241 of each sector-shaped projections 24 engages with the pin hole 421 of the sector-shaped projection 42 of the main body 4, as shown in FIG. 5A. Then the discs 2 are not completely fitting in the inner cavities 12 of the disc housings 1, consequently a user cannot press the push cap 6 and the sector-shaped projections 24 of the discs 2 cannot separate from the sector-shaped cavities 41 of the main body 4, preventing the bendable joint from being bent for collapsing the playpen.

If the playpen is to be collapsed, the bendable joint is to be lifted a little, forcing one end of the tubular portion 11 to slope down a little, and permitting the sector-shaped projections 24 to separate a little from the sector-shaped cavities 41 of the main body 4 so that the discs 2 may be moved by the disc housings 1 and then the pins 241 of the discs 2 no longer engage with the pin holes 421 of the main body 4. Then the push cap 6 becomes possible to be pressed, with the hooks 61 smoothly pushing the discs 2 to move into the cavities 12 of the disc housings 1 so that all the sector-shaped projections 24 of the discs 2 disengage from the sector-shaped cavities 41 of the main body 4 with a proper aperture between them. Then the disc housings 1 become quite free to move, allowing the bendable joint bend for collapsing the playpen.

The discs 2 are elastically urged by the springs 3, unable to move completely in the disc housings 1, and the pins 241 of the discs 2 normally fit in the pin holes 421 of the main body 4. At the same time, the pins 241 securely engage the pin holes 421 owing to the gravitational weight of the bendable joint itself and the frame bars, so the push cap cannot be pressed to cause the joint to bend, even if a child should press the push cap unintentionally. Then this structure gives substantial safety to the playpen.

If a user wants to collapse the playpen, at first, a bottom cushion of the playpen has to be lifted up and a pull band of the bottom should be pulled up nearly to a half height of the playpen, and then the joint has to be lifted a little, forcing the pins separate from the pin holes 421 so as to enable the push cap 6 pressed to push forward the discs 2 so that the sector-shaped projections 24 may disengage from the sector-shaped cavities 41. Or otherwise, the bendable joint cannot be bent.

While the preferred embodiment of the invention has been described above, it will be recognized and understood that various modifications may be made therein and the appended claims are intended to cover all such modifications which may fall within the spirit and scope of the invention.

What is claimed is:

1. A bendable joint for a collapsible playpen comprising:

two disc housings respectively having a circular portion and a tubular portion extending out from said circular portion, a plurality of teeth provided around an inner wall of said circular portion and a center hole bored in said circular portion;

two discs respectively having a plurality of teeth with different thickness around their periphery, a screw hole in a proper location, two opposite sector-shaped recesses and two opposite sector-shaped projections abutting with said two recesses on one side;

two springs respectively located between said discs and said two disc housings;

a main body having a pair of two opposite sector-shaped recesses in a side, two sector-shaped projections abutting to said two opposite sector-shaped recesses, a center hole bored in two portions of said two sector-shaped recesses and said sector-shaped projections, a pin hole bored in a side wall of one of said projections, and an inner cavity formed in the other side;

a push cap having two sidewise hooks at two opposite sides; and characterized by one of said sector-shaped projections of said discs having a pin projecting on a side wall, by one of said sector-shaped projections of said main body having a hole, by said discs fitted in said disc housings with said springs located between said discs and said disc housings, by said main body assembled together with said disc housings with said discs located between said main body and said disc housings, by screws inserted through said center holes of said main body, said center holes of said discs, said springs and said holes of said disc housings to screw with nuts for combining together said disc housings, said discs and said main body in their places, by said projecting pins of said discs engaging with said pin holes of said main body owing to the gravitational weight of said joint, by said hooks of said push cap hooking with said hook holes of said main body to constitute said joint, and by said tubular portion being inserted by an end of a frame bar of a playpen to form safe structure of said playpen.

* * * * *